United States Patent
Hergenrother

(10) Patent No.: US 8,362,150 B2
(45) Date of Patent: Jan. 29, 2013

(54) GAS-PHASE ANIONIC POLYMERIZATION

(75) Inventor: William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 878 days.

(21) Appl. No.: 12/389,506

(22) Filed: Feb. 20, 2009

(65) Prior Publication Data

US 2009/0209708 A1     Aug. 20, 2009

Related U.S. Application Data

(60) Provisional application No. 61/030,061, filed on Feb. 20, 2008.

(51) Int. Cl.
*C08F 136/04* (2006.01)
*C08F 236/04* (2006.01)
*C08F 236/10* (2006.01)
*C08F 4/48* (2006.01)
*C08F 2/34* (2006.01)

(52) U.S. Cl. ........ 525/180; 526/173; 526/181; 526/204; 526/209; 526/335; 526/340; 526/331.9; 526/332.9

(58) Field of Classification Search ............... 526/173, 526/180, 181, 204, 209, 335, 340; 525/331.9, 525/332.9
See application file for complete search history.

(56) References Cited

U.S. PATENT DOCUMENTS

| | | | |
|---|---|---|---|
| 4,429,091 A | 1/1984 | Hall | |
| 4,581,429 A | 4/1986 | Solomon et al. | |
| 5,066,729 A | 11/1991 | Stayer, Jr. et al. | |
| 5,322,912 A | 6/1994 | Georges et al. | |
| 5,401,804 A | 3/1995 | Georges et al. | |
| 5,521,309 A | 5/1996 | Antkowiak et al. | |
| 6,071,847 A * | 6/2000 | Cole et al. | 502/152 |
| 6,136,914 A | 10/2000 | Hergenrother et al. | |
| 6,194,509 B1 | 2/2001 | Lin et al. | |
| 6,271,314 B1 | 8/2001 | Hergenrother et al. | |
| 6,359,087 B1 | 3/2002 | Cole et al. | |
| 6,384,150 B2 | 5/2002 | Hergenrother et al. | |
| 6,472,486 B2 | 10/2002 | Klaerner et al. | |
| 2006/0241258 A1 | 10/2006 | Parker et al. | |
| 2008/0009597 A1 | 1/2008 | Yamago et al. | |

* cited by examiner

*Primary Examiner* — Roberto Rabago

(74) *Attorney, Agent, or Firm* — Meredith E. Hooker; Arthur M. Reginelli

(57) ABSTRACT

A method for copolymerizing alkenyl aromatic monomer and conjugated diene in the gas phase. Other embodiments include methods for forming anionic gas-phase polymerization using a solid-supported anionic polymerization catalyst.

33 Claims, No Drawings

GAS-PHASE ANIONIC POLYMERIZATION

This invention claims the benefit of U.S. Provisional Application Ser. No. 61/030,061, filed on Feb. 20, 2008, which is incorporated herein by reference.

TECHNICAL FIELD OF THE INVENTION

Embodiments of the present invention are directed toward processes for copolymerizing conjugated diene monomer and alkenyl aromatic monomer in gas-phase polymerizations. Other embodiments are directed toward processes for preparing functionalized polymers by employing anionic polymerization techniques in the gas phase. Still other embodiments are directed toward techniques for the gas-phase polymerization of conjugated diene monomer and monomer copolymerizable therewith by employing acid-cleavable solid-supported anionic polymerization catalysts.

BACKGROUND OF THE INVENTION

The gas-phase polymerization of conjugated diene monomers has been accomplished by employing solid-supported anionic catalyst. For example, U.S. Pat. No. 6,359,087 teaches gas-phase anionic polymerization techniques that employ catalysts having the formula $P(Me)_n$, where P is a metalatable particle having a diameter of about 1 micron to about 1000 microns comprising a bound rubber. The particle is multiply-metalated with "n" covalently bonding Group IA alkali metal (Me) atoms. The bound rubber particle may comprise any metalatable carbon black-bound rubber, such as carbon black-styrene butadiene rubber, carbon black-butadiene rubber, carbon black-natural rubber, and the like. These anionic polymerization initiators, when charged into the reaction zone of a gas-phase apparatus, are capable of anionically homopolymerizing conjugated diolefin monomer having about 4 to about 12 carbon atoms and copolymerizing conjugated diolefin monomers and monovinyl aromatic monomers having from about 8 to about 20 carbon atoms to form very high molecular weight branched diene polymers. The resulting polymers are macro-branched and are characterized by being light and granular.

While the prior art contemplates copolymerization of vinyl aromatic monomer with conjugated diene monomer in the gas phase, formation of a vinyl aromatic gaseous stream is difficult. As those skilled in the art appreciate, vinyl aromatic monomer, such as styrene, will self-polymerize upon heating. Under atmospheric pressure, this heat triggered self-polymerization occurs at temperatures below the boiling temperature of styrene. Therefore, a reduction in the vaporization temperature is required, but even under vacuum, the formation of the gas stream of styrene can be problematic to achieve.

As noted above, the polymer product produced by known gas-phase anionic polymerization techniques are macro-branched diene polymers that are light and granular. While this may be advantageous in many instances, these macro-branched diene polymers may be disadvantageous in other instances. That is, it may be desirable to produce, by gas-phase polymerization, conjugated diene polymers that are linear and uncoupled.

SUMMARY OF THE INVENTION

One or more embodiments of the present invention provide a method for the gas-phase polymerization of conjugated diene monomer and alkenyl aromatic monomer to form copolymers, the method comprising the steps of: (i) preparing a mixture of a alkenyl aromatic monomer and a stable free radical; (ii) heating the mixture to form a gaseous stream of alkenyl aromatic monomer; (iii) providing a gaseous stream of conjugated diene monomer; (iv) introducing the stream of conjugated diene monomer and the stream of alkenyl aromatic monomer to form a copolymerizable gaseous monomer mixture; (v) introducing an anionic polymerization catalyst to a gas-phase reactor zone; (vi) introducing the copolymerizable gaseous monomer mixture to the gas-phase reactor zone; (vii) allowing the copolymerizable gaseous monomer mixture to polymerize into a copolymer including mer units deriving from conjugated diene monomer and alkenyl aromatic monomer; and (viii) withdrawing the copolymer from the gas-phase reactor zone.

One or more embodiments of the present invention further provide a method for gas-phase anionic polymerization of conjugated diene monomers and optionally monomer copolymerizable therewith, the method comprising the steps of:
(i) charging into a gas-phase reaction zone;
    (a) a solid supported anionic polymerization catalyst having the formula $P(\Psi\text{-Me})_n$ wherein P represents a particle, $\Psi$ represents a divalent group that is base stable and acid cleavable, Me is a group IA alkali metal atom, and n is an integer equal to or greater than 3; and
    (b) an anionically polymerizable monomer selected from the group consisting of conjugated diolefin monomers having from about 4 to about 12 carbon atoms and the diolefin monomers together with monovinyl aromatic monomers having from about 8 to about 20 carbon atoms;
(ii) allowing the monomers to polymerize to form a macro-branched polymer and
(iii) withdrawing the macro-branched polymer from the reaction zone.

One or more embodiments of the present invention still further provide a macro-branched polymer defined by the formula:

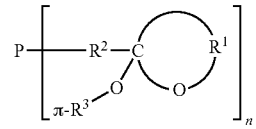

where P is a particle, $R^1$ is a divalent organic group, $R^2$ is a divalent organic group or a chemical bond, and $R^3$ is a divalent organic group, $\pi$ is a polymer chain, and n is an integer greater than 3.

DETAILED DESCRIPTION OF THE INVENTION

One or more embodiments of the present invention are directed toward a method for the gas-phase copolymerization of conjugated diene monomer and alkenyl aromatic monomer. In one or more embodiments, liquid alkenyl aromatic monomer is introduced with a stable free radical, and then the alkenyl aromatic monomer is heated to a desired vapor pressure and converted to the gas-phase. The gas-phase alkenyl aromatic monomer is then delivered to a polymerization zone where the monomer is copolymerized with conjugated diene monomer. Practice of the present invention advantageously allows for the delivery of relatively stable gas-phase alkenyl aromatic monomer to the polymerization zone and thereby avoids unwanted thermal, self polymerization of alkenyl aromatic monomer that can be experienced when alkenyl aromatic monomer is heated to near its boiling point.

Alkenyl aromatic monomer includes vinyl aromatic monomer. Useful vinyl aromatic monomer includes styrene, alpha-methylstyrene, beta-methylstyrene, and alkyl substituted meta, para, and ortho styrenes, and mixtures thereof.

Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

In one or more embodiments, a step in the process of this invention includes introducing alkenyl aromatic monomer with a stable free radical compound. In one or more embodiments, stable free radical compounds include those compounds that have an available unpaired electron that, due to one or more circumstances, will not self-stabilize by combining with another like molecule. For example, these compounds will not join with like compounds and thereby self-stabilize due to stearic hindrance; that is, the available non-paired electron is sterically protected or shielded by other groups or substituents on the molecule.

Examples of stable free radical compounds include 2,2,6,6,-tetramethyl-1piperidinoxyl (a.k.a. TEMPO), derivatives of 2,2,6,6,-tetramethyl-1-piperidinoxyl, galvinoxyl, derivatives of galvinoxyl, diphenylpicrylhydrazyl, and derivatives of diphenylpicrylhydrazyl. Examples of derivatives of TEMPO include 4-hyroxy-TEMPO, 4-acyloxy-TEMPO, 4-amido-TEMPO, and 4-acylated amido-TEMPO. Other examples include nitroxide compounds.

In other embodiments, stable free radical compounds include Gomberg radicals, which are compounds known to form stable free radicals in solution (i.e. within solvents in which the compounds are soluble). Examples of Gomberg radicals include hexaphenylethane and the 2,6 disubstitued phenyl derivatives of hexaphenylethane.

The amount of stable free radical compound introduced with the alkenyl aromatic monomer may be expressed in terms of a molar ratio of stable free radical compound to alkenyl aromatic monomer. In one or more embodiments, the molar ratio of stable free radical compound to alkenyl aromatic monomer may be at least 0.01:1, in other embodiments at least 0.05:1, and in other embodiments at least 0.1:1. In these or other embodiments, the molar ratio of stable free radical compound to alkenyl aromatic monomer may be less than 0.5:1, in other embodiments less than 0.4:1, and in other embodiments less than 0.3:1. In one or more embodiments, the molar ratio of stable free radical compound to alkenyl aromatic monomer is from about 0.01:1 to about 0.5:1, in other embodiments from about 0.05:1 to about 0.4:1, and in other embodiments from about 0.1:1 to about 0.3:1.

The condition under which the stable free radical and the alkenyl aromatic monomer are introduced can be varied. In one or more embodiments, the compounds are introduced below the boiling point of the alkenyl aromatic monomer; that is, the compounds introduced under conditions in which the alkenyl aromatic compound is in its liquid state. In particular embodiments, the stable free radical and the alkenyl aromatic monomer are introduced at a temperature from about 0° C. to about 60° C., or in other embodiments from about 20° C. to about 50° C. In these or other embodiments, the stable free radical and the alkenyl aromatic monomer are introduced under a pressure of from about 1 kPa to about 300 kPa, or in other embodiments from about 7 kPa to about 200 kPa.

Once introduced, the stable free radical and the alkenyl aromatic monomer can be mixed, blended, or otherwise agitated. In particular embodiments, a carrier gas is bubbled through a solution containing the mixture. Useful carrier gases include, but are not limited to, inert gases such as argon, helium, and nitrogen, as well as gases such as conjugated diene monomer.

Once the alkenyl aromatic monomer has been introduced with the stable free radical, a gaseous stream of the alkenyl aromatic monomer can be produced by using known techniques. For example, the temperature of the mixture can be increased or the pressure under which the mixture is maintained can be decreased, or a combination of both techniques can be employed to produce the gaseous stream. Upon heating the mixture, the formation of alkenyl aromatic monomer radicals may occur, and radical alkenyl aromatic monomer can join with the stable free radical compound to prevent thermal polymerization of the alkenyl monomer. Without wishing to be bound by any particular theory, the alkenyl aromatic monomer radicals are believed to be stabilized by combining with the stable free radical compounds to form stable alkenyl aromatic monomer radicals.

In one or more embodiments, the mixture of the stable free radical and alkenyl aromatic monomer is increased to at temperature of at least 25° C., in other embodiments to at least 40° C., and in other embodiments at least 65° C. In these or other embodiments, the temperature of the mixture of the alkenyl aromatic monomer and stable free radical is maintained below 150° C., in other embodiments below 130° C., and in other embodiments below 100° C.

In one or more embodiments, the pressure under which the mixture of stable free radical and alkenyl aromatic monomer is maintained is decreased below 1 kPa, in other embodiments below 7 kPa, and in other embodiments below 15 kPa. In these or other embodiments, the pressure under which the mixture of stable free radical and vinyl aromatic monomer is maintained is from about 100 kPa to about 300 kPa.

In one or more embodiments, the alkenyl aromatic monomer and the conjugated diene monomer are introduced to form a copolymerizable mixture. In one or more embodiments, the introduction of conjugated diene monomer and alkenyl aromatic monomer takes place after introducing the alkenyl aromatic monomer with the stable free radical. In one or more embodiments, the combination of conjugated diene monomer and alkenyl aromatic monomer may take place in the liquid phase, or in other embodiments the introduction of the conjugated diene monomer and the alkenyl aromatic monomer may take place in the gaseous phase. In the latter case, a gaseous stream of conjugated diene monomer can be introduced with a gaseous stream of alkenyl aromatic monomer.

The amount of conjugated diene monomer combined with the alkenyl aromatic monomer may be expressed as a molar ratio of conjugated diene monomer to alkenyl aromatic monomer. In one or more embodiments, the molar ratio of alkenyl aromatic monomer to conjugated diene monomer may be from about 0.02:1 to about 0.5:1, in other embodiments from about 0.05:1 to about 0.4:1, or in other embodiments from about 0.1:1 to about 0.3:1.

Once the gaseous copolymerizable monomer mixture is formed, the gaseous mixture is introduced to a catalyst or initiator within a polymerization zone. In one or more embodiments, the gaseous mixture may be formed prior to delivery to the polymerization zone, or in other embodiments, the gaseous mixture may be formed within the polymerization zone. In other words, in the latter embodiment, gaseous conjugated diene monomer and gaseous stable alkenyl aromatic monomer radicals are separately introduced into the polymerization zone.

Techniques for introducing polymerizable monomer catalyst or initiator are known in the art, as are techniques for polymerizing the monomer, as disclosed in U.S. Pat. No. 6,359,087, which is incorporated herein by reference. For example, the catalyst or initiator may be introduced into a gas-phase reaction zone together with the anionically polymerizable monomer mixture; the monomer mixture is then allowed to polymerize to form a polymer, and the polymer is then withdrawn from the reaction zone. Various techniques can be employed including batch, semi-batch, and continuous polymerization techniques. When using a batch or semi-batch gas-phase polymerization process, the method of this invention may further include the step of terminating the polymerization with a terminating or functionalizing agent prior to withdrawing the polymer from the reaction zone. If a continuous gas-phase polymerization process is employed, the polymerization reaction may be terminated outside of the reaction zone.

The polymerization can be carried out by contacting the polymerizable monomer mixture with a catalyst in the reaction zone of any reactor suitable for gas-phase polymerization, for example in a stirred reactor, in a rotary reactor, or in a fluidized-bed reactor or in any combination of these various reactor types. These reactors are well known to those skilled in the art, as are the temperatures and pressures under which polymerization may take place. The catalyst can be charged to the reaction zone in a slurry, as a suspension in a hydrocarbon solvent, or as a dry powder. Thus, the method may further comprise the step of removing the solvent from the reaction zone prior to charging the monomers, such as by purging the reaction zone with nitrogen or another inert gas. The polymerization reaction should be carried out under anhydrous, anaerobic conditions in an inert gas, such as nitrogen and the like. The polymerization may be carried out under pressures of 0.1 kPa to 5 MPa, or in other embodiments under pressures of 100 kPa to 2 MPa. The polymerization can be generally carried out at any convenient temperature, such as about −20° C. to about 250° C. For batch polymerizations, it may be useful to maintain the peak temperature at from about 49° C. to about 149° C., or from about 80° C. to about 120° C. Polymerization may be allowed to continue under agitation for about 0.15 to 24 hours.

The catalyst or initiator employed to effect the polymerization of the monomer mixture can include those known in the art or otherwise described herein. For example, solid-supported catalysts described in U.S. Pat. No. 6,359,087, which is incorporated herein by reference, may be employed. Techniques for charging these initiators into the reaction zone are likewise disclosed in this patent.

Other solid supported anionic catalysts that are suitable for use in gas phase polymerization of conjugated diene monomers, as described herein, are disclosed U.S. Pat. Nos. 6,384,150 and 6,271,314, the disclosure of which relating to the initiators and methods for their preparation is hereby incorporated by reference. The disclosed initiators, which are also useful for solution phase anionic polymerization of conjugated diene monomers, have the same formula as the catalysts in that the particle portion of the disclosed initiators comprises a metalatable thermoplastic polymer (preferably having a $T_g$ of 80° C. to about 300° C.) or a cured elastomer, rather than a bound rubber.

Other embodiments of the present invention are directed toward methods for the gas-phase anionic polymerization of conjugated diene monomers and optionally monomer copolymerizable therewith that employs a novel solid-supported anionic polymerization catalyst. These embodiments advantageously produce macro-branched polymers that are acid cleavable.

In one embodiment of the invention, the catalyst has the formula

wherein P represents a particle; Me is a Group IA alkali metal atom covalently bonded to the particle, Ψ represents a divalent group that is base stable and acid cleavable, and n is an integer equal to or greater than 3.

Ψ, which is a divalent organic group, is base stable and acid cleavable. Divalent organic groups may include hydrocarbylene groups or substituted hydrocarbylene groups such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups. In one or more embodiments, each group may contain from 1 carbon atom, or the appropriate minimum number of carbon atoms to form the group, up to about 20 carbon atoms. Substituted hydrocarbylene groups include a hydrocarbylene groups in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms.

In one or more embodiments, base stable divalent organic groups include those groups that will not be cleaved (i.e broken into two constituents or compounds) or added to at an appreciable rate by a Lewis base. In particular embodiments, Ψ will not, at an appreciable rate, be "cleaved" or "added to" by an organolithium compound. In one or more embodiments, cleaved or added to at an appreciable rate includes that rate that would have a material impact on gas-phase polymerization. In these or other embodiments, cleaved or added to at an appreciable rate includes that rate that would have an appreciable impact on the handling and/or transport of the polymer following the polymerization.

In one or more embodiments, acid cleavable divalent organic groups include those groups that include at least one moiety or substituent that will divide in the presence of a proton, which may be donated by a Bronsted acid. For example, Ψ may include an acetal, which can be hydrolyzed to cleave the acetal into a polymeric end-capped alcohol and a ketone or aldehyde and thereby divide the divalent organic group. In one or more embodiments, the cleaving or dividing of the divalent organic group will free the polymer chain from the particle.

In one or more embodiments, Ψ includes an acetal group defined by the formula

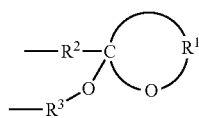

where $R^1$ is a divalent organic group, $R^2$ is a divalent organic group or chemical bond, and $R^3$ is a divalent organic group. In one or more embodiments, $R^1$ may include from about 3 to about 5 carbon atoms, and in other embodiments 4 carbon atoms. In one or more embodiments, one or more of the carbon atoms within the divalent organic group $R^1$ are substituted with a monovalent organic group.

In particular embodiments, Ψ is defined by the formula

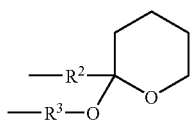

where $R^2$ and $R^3$ are defined as above.

In one or more embodiments, the particle P is chemically bound to the group Ψ, which as noted above is a divalent group that is base stable and acid cleavable. Accordingly, P derives from a particle that will react with a reactant and yield the group Ψ chemically bonded thereto. In one or more embodiments, P derives from a particle that can be reacted with a lactone in the presence of an acid catalyst.

In one or more embodiments, the particle may include those particles described in U.S. Pat. No. 6,359,087, which is incorporated herein by reference.

In one or more embodiments, the particle P has a diameter of at least 0.05 microns, in other embodiments at least 0.1 microns, in other embodiments at least 0.5 microns, and in other embodiments at least 1 micron. In these or other embodiments, the particle P has a diameter of less than 1200 microns, in other embodiments less than 1000 microns, in other embodiments less than 800 microns, and in other embodiments less than 500 microns.

In one or more embodiments, the particle P is a thermoplastic homopolymer having a $T_g$ of about 80° C. to about 300° C., a crosslinked thermoplastic resin, substituents deriving from compounds including 3 or more aromatic groups, a cured elastomer, a bound rubber, and mixtures thereof. For example, carbon black-bound rubber, such as carbon black-styrene butadiene rubber, carbon black-butadiene rubber, carbon black-natural rubber, and the like.

In one aspect of this embodiment of the invention, the particle includes a carbon black-bound rubber prepared as described below, including, but not limited to, carbon black-styrene butadiene rubber, carbon black-polybutadiene rubber, carbon black-polyisoprene rubber, carbon black-styrene isoprene rubber, carbon black-styrene butadiene isoprene rubber, and carbon black-natural rubber. Other bound rubbers are well known to those skilled in the art. The bound rubber particle provides a simple carbon network solid support for use in the catalyst. Thus, when employed as the particle portion of the gas-phase anionic polymerization catalyst to produce the macro-branched polymers, the particle remains as part of the macro-branched polymer complex. When the macro-branched polymers that include the bound rubber particles are compounded or milled, the points of attachment of the polymers to the particles are shear-degraded, thus allowing for better processibility of the polymers.

In another aspect of this embodiment of the invention, the particle includes a thermoplastic polymer that may have a $T_g$ of about 80° C. to about 300° C. Suitable thermoplastic polymers for use in the invention include, but are not limited to, polyethylene, polypropylene, polystyrenes, substituted polystyrenes, and the like. Other metalatable thermoplastic polymers are well known to those skilled in the art. When employed as the particle portion of the anionic polymerization catalyst to produce the macro-branched polymers, this particle may or may not remain as part of the macro-branched polymer complex.

In yet another aspect of this embodiment of the invention, the particle comprises a cured elastomer. The cured elastomer may be any cured elastomer known to those skilled in the art, including compounded cured rubber, such as scrap tire rubber. Exemplary cured elastomers suitable for use in the invention are styrene butadiene rubber, natural rubber, polybutadiene, polyisoprene, and the like. Other examples of cured elastomers are well known to those skilled in the art. Because some oils, curing agents and other ingredients in compounded cured rubber may interfere with the formation of the catalyst compound, the compounded cured rubber particle may be extracted with acetone for at least 16 hours to substantially remove at least the curing agents prior to use in preparation of the catalyst. When the macro-branched polymers that include the cured elastomeric particles are compounded or milled, the points of attachment of the polymers to the particles are shear-degraded, thus allowing for better processibility of the polymers.

In one or more embodiments, the particles, which may have a diameter of about 1 to about 1000 microns, may be conveniently sized by passing them through a mesh of fixed pore size, as is well known in the art. For example, 20-mesh particles are about 841 microns or less in diameter; 200-mesh particles are about 74 microns or less; and 400-mesh particles are about 37 microns or less. The number of metalation sites on the particles depends on the size of the particles, the concentration of the alkali metal compound employed in the metalation reaction, the process times and temperatures, the polar coordinator employed in the preparation of the particles, and the like.

In one or more embodiments, the particle may derive from a particle having three or more double bonds or three or more aromatic groups. As those skilled in the art will appreciate, the integer "n" represents the number of base stable acid cleavable divalent groups Ψ chemically bonded to the particle through reactive sites that existed on the particle such as double bonds or aromatic groups.

In one or more embodiments, the bound rubber particles may be prepared in a mixer having variable speed rotors and a temperature control, such as Banbury or Brabender mixer. The rotor speeds and mixer temperatures for preparing bound rubber are known to those skilled in rubber processing. In general, rotor speeds of about 10 rpm to about 200 rpm may be employed to achieve temperatures of about 26° C. to about 204° C. To prepare the bound rubber particles, the polymer is introduced into the mixing chamber and carbon black is gradually added. It may be desirable to add an excess of carbon black in order to achieve a high percentage of carbon black-bound rubber. In particular embodiments, at least 25% of the polymer can be bound with carbon black, in other embodiments at least 35% and in other embodiments at least 50% of the polymer can be bound with carbon black. Thus, it may be desirable that some free carbon black remains in the mixture in addition to the carbon black bound to the polymer. In one or more embodiments, a weight ratio of polymer to carbon black of about 1:1 generally results in the desired excess amount of carbon black. The polymer and carbon black are then mixed at a selected temperature and rotor speed, for a time sufficient to pulverize the mixture to the desired particle size and to allow the desired amount of the polymer to be bound with carbon black. In general, at a given rotor speed and mixing temperature, the longer the mixing time, the more carbon black is bound, the shorter the mixing time, the less carbon black is bound. For example, at a rotor speed of 60 rpm and a mixing temperature of 140° F., a mixing time of 20 minutes can result in particles having a higher than 50% level of bound rubber. Polymers that have been previously "functionalized," to facilitate binding of the carbon black, can produce a higher percentage of bound rubber. The particles are then removed from the mixer and sized for use in the preparation of the solid supported anionic catalyst.

In one or more embodiments, the percentage of rubber bound with carbon black may be determined as follows. The rubber prepared as above is soaked in toluene for at least 16 hours and preferably about 24 hours. Rubber that has not bound carbon black will dissolve in the toluene. The remaining undissolved rubber has bound carbon black. The weight percentage of bound rubber in the original preparation is mathematically determined.

The number of metal atoms bound to the bound rubber particle can range from n=3 to n=a multiplicity of atoms, $10^x$ (e.g., $10^{10}$). The alkali metal atoms bonded to a single particle may all be the same or may be different from each other. The metal atoms may be any Group IA metal including lithium, sodium, potassium, rubidium, cesium and francium. In one or more embodiments, the metal atoms are selected from lithium, sodium and potassium. In particular embodiments, a mixture of lithium atoms and at least one of sodium atoms and potassium atoms is used. In one or more embodiments, all of the alkali metal atoms are the same and are lithium atoms.

In one or more embodiments, the solid supported anionic polymerization catalyst may be prepared by (i) reacting a particle including three or more double bonds or three or more aromatic groups with lactone in the presence of an acid catalyst; (ii) dehydrating the resulting product to form a substituted mono-unsaturated cyclic ether; (iii) reacting the substituted mono-unsaturated cyclic ether with a halogenated alcohol to form a halogenated intermediate; (iv) treating the halogenated intermediate with an organo Group 1A alkali metal compound in the presence of a polar coordinator.

In one or more embodiments, lactones include cyclic inner esters of a carboxylic acid, which may be formed by intramolecular reaction of hydroxylated or halogenated carboxylic acids with elimination of water. In one or more embodiments, lactones may be defined by the formula

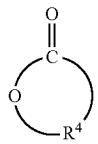

where $R^4$ is a divalent organic group.

Examples of lactones useful in practicing the present invention include butyrolactone, gamma-valerolactone (five-membered ring), delta-valerolactone (six-membered ring) and substituted derivatives thereof.

In one or more embodiments, the reaction between the lactone and the particle may take place within an inert solvent such as nitrobenzene. The particle may be dissolved in the solvent or in the form of a swollen particle. As noted above, this reaction takes place in the presence of an acid catalyst. In these or other embodiments, the reaction between the particle and the lactone may take place under acidic conditions. In one or more embodiments, the reaction may be conducted at a temperature of about 25° C. to about 120° C., and may proceed for up to 24 hours at atmospheric pressure or pressures slightly higher than atmospheric pressure.

In one or more embodiments, the acid catalyst may include a strong Lewis acid. Examples of acid catalysts include Friedel-Crafts catalysts. Exemplary Friedel-Crafts catalysts include, but are not limited to, aluminum chloride, iron chloride, and zinc chloride.

In one or more embodiments, the reaction of the lactone with the particle in the presence of the acid catalyst forms a keto-alcohol.

In one or more embodiments, the product resulting from the reaction of the particle and the lactone can be dehydrated by employing techniques known in the art. These techniques are disclosed in publications such as *The Protection of hydroxyl Groups*, JACS Vol. 70, pp. 4187 to 4189 (1948), which is incorporated herein by reference. In one or more embodiments, dehydration takes place in the under mildly acidic conditions (e.g. pH of 3-5) such as may be achieved in an aqueous environment (including aqueous suspension or slurry) with a Bronsted acid adjusted to an appropriate concentration to achieve the desired pH. Catalysts, such as hydrochloric acid, may be employed. The conditions under which the dehydration takes place may include generally moderate temperature and pressure, although temperature can be increased for kinetic benefits.

Dehydration of the reaction product of the lactone and the particle including three or more double bonds produces a substituted mono-unsaturated cyclic ether. An exemplary substituted mono-unsaturated cyclic ether is substituted dihydropyran. This ether is then reacted with a halogenated alcohol to form a halogenated intermediate. Halogenated alcohols may be generally defined by the formula $R^5$—OH, where $R^5$ is a monovalent organic group having at least one halogenated substituent. In other words, at least one hydrogen atom of the monovalent organic group is substituted with a halogen atom. Exemplary halogenated alcohols include 3-chloro-propanol.

The reaction between the substituted mono-unsaturated cyclic ether and the halogenated alcohol can take place under conditions known in the art. For example, the reaction can take place within an inert solvent under moderately acidic conditions. In these or other embodiments, the reaction can take place under generally moderate conditions of temperature and pressure.

Once the halogenated intermediate is formed, the halogenated intermediate can be treated (i.e. reacted with) an organo Group 1A alkalide metal compound in the presence of a polar coordinator.

In one or more embodiments, the alkali metal compound employed in the preparation of the metalated solid supported anionic catalyst has the formula R(Me), where Me is a metal of Group IA of the Periodic Table of the Elements, (e.g., lithium, sodium and potassium), and R is a monovalent organic group such as a hydrocarbyl group having from one to about 20 carbon atoms. Although lithium alkali metal compounds are contemplated in the method, sodium and/or potassium and/or other Group IA alkali metal compounds including rubidium, cesium and francium, may also be separately employed. In particular embodiments, these other compounds are used in a mixture with a lithium compound and the sodium and/or potassium and/or other Group IA compound acts as a co-agent with the lithium compound for metalation. Thus, as described above, the resulting particles may be metalated with one or more types of alkali metal atoms derived from the alkali metal compound(s).

Typical R groups include aliphatic and cyclo-aliphatic groups such as alkyls, cycloalkyls, alkenyls, alkynyls, aryls and aralkyls. Specific examples of R groups include, but are not limited to, methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, cyclohexyl, [2.2.1]-bicycloheptyl, methylcyclopentyl, dimethylcyclopentyl, ethylcyclopentyl, methylcyclohexyl, dimethylcyclohexyl, ethylcyclohexyl, isopropylcyclohexyl, combinations of these, and the like. An example of an alkali metal compound for use in preparing the metalated catalysts of the invention is n-butyl lithium.

In one or more embodiments, polar coordinators include Lewis bases with an unshared pair of electrons. Compounds useful as polar coordinators may be organic and include, but are not limited to, tetrahydrofuran, linear and cyclic oligomeric oxolanyl alkanes such as 2,2'-di(tetrahydrofuryl)propane, di-piperidyl ethane, dimethyl ether, pentamethyl diethylenediamine, diazabicyclooctane, hexamethylphosphoramide, N,N'-dimethylpiperazine, diethyl ether, tributylamine and the like. The linear and cyclic oligomeric oxolanyl alkane polar coordinators are described in U.S. Pat. No. 4,429,091, the subject matter of which regarding polar solvents is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; fully alkylated diamines such as tetramethylethylene diamine (TMEDA); and fully alkylated triamines.

The reaction between the halogenated intermediate and the organo Group 1A alkalide metal compound may take place within environments and under conditions as set forth in U.S. Pat. No. 6,359,087, which is incorporated herein by reference.

In one or more embodiments, the solid supported anionic polymerization catalyst prepared in accordance with one or more embodiments of the present invention can be isolated from the medium in which it was prepared by employing known techniques. In other embodiments, the catalyst can be delivered or otherwise charged to the polymerization zone for use as a polymerization catalyst within the medium in which it was prepared. And, polymerization of monomer within the polymerization zone can be accomplished by using techniques known in the art. In these respects, reference can be made to U.S. Pat. No. 6,359,087, which is incorporated herein by reference.

Lastly, any solvent that may be present after termination of the polymerization reaction can be removed from the polymer by conventional techniques. These include steam or alcohol coagulation, thermal desolventization, or any other suitable method. Additionally, solvent may be removed by drum drying, extruder drying, vacuum drying or the like. Desolventization by drum-drying, coagulation in alcohol, steam or hot water desolventization, extruder drying, vacuum drying, spray drying, and combinations thereof can be used. An antioxidant, such as butylated hydroxy toluene (BHT) and/or an antiozonant compound, can be added to the polymer after removal from the reaction zone.

Functionalizing agents are compounds that provide a functional group that remains on the polymer chain (e.g., end of the chain). Any compounds providing terminal functionality (e.g., "endcapping") that are reactive with the polymer bound metal can be selected to provide a desired functional group. In particular embodiments, the functionalizing agents are not also coupling agents (i.e., the functionalizing agents should not couple together the chain ends) so that the branched structure of the polymer is maintained. In particular embodiments, functionalizing agents are used when elastomers are polymerized by the process of the invention because the functional group promotes uniform and homogeneous mixing with fillers, such as silica and carbon black. Therefore, for example, compounding of vulcanizable macro-branched elastomers, prepared by the process of the invention, results in rubber products exhibiting improved physical properties, such as reduced hysteresis, which means a rubber product having increased rebound, decreased rolling resistance in tires, and lessened heat build-up when subjected to mechanical stress. Examples of these compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tributyl tin chloride, and mixtures of these. Further examples of reactive compounds include the terminators described in U.S. Pat. Nos. 5,066,729 and 5,521,309, the subject matter of which, pertaining to terminating agents and terminating reactions, is hereby incorporated by reference. The practice of the present invention is not limited solely to these terminators, since other compounds that are reactive with the polymer bound alkali metal can be selected to provide a desired functional group. Once a desired polymerization is achieved, the polymer, which is in the form of a macro-branched polymer, can be removed from the polymerization zone by employing known techniques. The removal of the polymer product may occur after functionalization or quenching of the reactive polymer ends.

Once removed from the polymerization zone, the polymer product can be introduced with a proton donor in order to effect cleavage of the Ψ group. The polymer product and proton donor can be introduced within an aqueous medium.

Hydrolysis reactions, which can be used to cleave Ψ group are generally known in the art as described in *General Acid Catalysis and the pH-Independent Hydrolysis fo 2-(p-Nitrophenoxy)tetrahydropyran*, JACS, Vol. 92, pp. 1681-1684 (1970).

Useful proton donors include mineral and organic acids. In one or more embodiments, the mineral or organic acids may be characterized by a pKa of at least 0, in other embodiments at least 1, and in other embodiments at least 2. In these or other embodiments, the mineral or organic acids may be characterized by a pKa of less than 6, in other embodiments less than 5, and in other embodiments less than 4.

Exemplary useful organic acids include trifluoroacetic acid and formic acid. Exemplary useful mineral acids include hydrochloric, hydrobromic and sulfuric acids.

Practice of the present embodiment of this invention can advantageously be employed to produce linear polymers having a hydroxyl end group. As those skilled in the art will appreciate, the hydrolysis of the Ψ group can produce a polymer having a hydroxyl group attached to the head of the polymer chain (i.e. location where polymerization was initiated).

For example, the gas-phase polymerization of conjugated diene monomer, optionally together with copolymerizable monomer, by using the solid-supported catalyst disclosed herein (i.e. P(Ψ-Me)$_n$) will produce macro-branched polymers having the general formula P(Ψ-R-π)$_n$, where P is a particle as disclosed above, R is a divalent organic group or bond, π is a polymeric chain, and n is an integer as disclosed above. In particular embodiments, the macro-branched polymer may have the general formula,

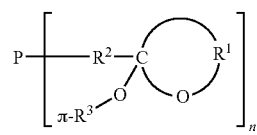

where P, π, R$^1$, R$^2$, R$^3$, and n are as described above.

Practice of one or more embodiments of the present invention is not limited by the polymer chain π. In certain embodiments, the polymer chain is saturated, and in other embodiments the polymer chain is unsaturated. In certain embodiments, the polymer chain is a thermoplastic polymer, and in other embodiments, the polymer chain is amorphous or only slightly crystalline. In particular embodiments, the polymer chain has a glass transition temperature ($T_g$) that is less than 0° C., in other embodiments less than −20° C., and in other embodiments less than −30° C. In one embodiment, the polymers may exhibit a single glass transition temperature.

In one or more embodiments, the polymer chain $\pi$ is an elastomer, which refers to a polymer chain that is capable of being vulcanized into a vulcanizate exhibiting elastomeric properties.

In one or more embodiments, the polymer chain $\pi$ is a homopolymer, and in other embodiments the polymer chain $\pi$ is a copolymer, which refers to a polymer having two or more chemically distinct mer units. In one or more embodiments, the mer units of the polymer may be cis, trans, or vinyl.

In one or more embodiments, the polymer chain $\pi$ is a medium or low cis polydiene (or polydiene copolymer) including those prepared by anionic polymerization techniques. These polydienes can have a cis content of from about 10% to about 70%, in other embodiments from about 15% to about 60%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the polymer chain $\pi$ is a random copolymer of butadiene, styrene, and optionally isoprene. In other embodiments, the polymer chain $\pi$ is a block copolymer of polybutadiene, polystyrene, and optionally polyisoprene. In particular embodiments, the polymer chain is hydrogenated or partially hydrogenated. In particular embodiments, where the polydiene polymer is prepared by employing a functional anionic initiator, the head of the polymer chain ($\pi$) includes a functional group that is the residue of the functional initiator.

In one or more embodiments, the polymer chain $\pi$ is an anionically-polymerized polymer selected from the group consisting of polybutadiene, functionalized polyisoprene, functionalized poly(styrene-co-butadiene), functionalized poly(styrene-co-butadiene-co-isoprene), functionalized poly(isoprene-co-styrene), and functionalized poly(butadiene-co-isoprene). The number average molecular weight ($M_n$) of these polymers may be from about 5 kg/mol to about 1 kg/mol, in other embodiments from about 50 kg/mol to about 500 kg/mol, and in other embodiments from about 100 kg/mol to about 300 kg/mol, as determined by using gel permeation chromatography (GPC) calibrated with polystyrene standards and Mark-Houwink constants for the polymer in question. The polydispersity of these polymers may be from about 1.0 to about 3.0, and in other embodiments from about 1.1 to about 2.0.

In one or more embodiments, where the gas-phase synthesized polymers are functionalized (i.e. end-capped), ditelechelic polymers can advantageously be produced. For example, where the polymers are end-capped with functionalizing agents such as ethylene oxide, or linear polymers that are dihydroxy terminated (i.e. a hydroxyl group at both ends of the polymer) can be produced.

Various modifications and alterations that do not depart from the scope and spirit of this invention will become apparent to those skilled in the art. This invention is not to be duly limited to the illustrative embodiments set forth herein.

The invention claimed is:

1. A method for the gas-phase polymerization of conjugated diene monomer and alkenyl aromatic monomer to form copolymers, the method comprising the steps of:
   (i) preparing a mixture of a alkenyl aromatic monomer and a stable free radical compound;
   (ii) heating the mixture to form a gaseous stream of alkenyl aromatic monomer;
   (iii) providing a gaseous stream of conjugated diene monomer;
   (iv) introducing the stream of conjugated diene monomer and the stream of alkenyl aromatic monomer to form a copolymerizable gaseous monomer mixture;
   (v) introducing an anionic polymerization catalyst to a gas-phase reactor zone;
   (vi) introducing the copolymerizable gaseous monomer mixture to the gas-phase reactor zone;
   (vii) allowing the copolymerizable gaseous monomer mixture to polymerize into a copolymer including mer units deriving from conjugated diene monomer and alkenyl aromatic monomer; and
   (viii) withdrawing the copolymer from the gas-phase reactor zone.

2. The method of claim 1, where the stable free radical compound is a nitroxide compound.

3. The method of claim 1, where the stable free radical is selected from the group consisting of 2,2,6,6,-tetramethyl-1-piperidinoxyl, derivatives of 2,2,6,6,-tetramethyl-1-piperidinoxyl, galvinoxyl, derivatives of galvinoxyl, diphenylpicrylhydrazyl, and derivatives of diphenylpicrylhydrazyl.

4. The method of claim 1, where the stable free radical compound is a Gomberg radical.

5. The method of claim 1, where said step of heating includes heating the mixture to a temperature of about 25° C. to about 150° C.

6. The method of claim 1, where said step of heating includes heating the mixture to a temperature of about 40° C. to about 130° C.

7. The method of claim 1, where the molar ratio of the stable free radical to the alkenyl aromatic monomer is from about 0.01:1 to about 0.5:1.

8. The method of claim 1, where the molar ratio of the stable free radical to the alkenyl aromatic monomer is from about 0.05:1 to about 0.4:1.

9. The method of claim 1, where the molar ratio of alkenyl aromatic monomer to conjugated diene monomer within the copolymerizable gaseous monomer mixture is from about 0.02:1 to about 0.5:1.

10. The method of claim 1, where the molar ratio of alkenyl aromatic monomer to the conjugated diene monomer within the copolymerizable gaseous monomer mixture is from about 0.05:1 to about 0.4:1.

11. The method of claim 1, where the alkenyl aromatic monomer is vinyl aromatic monomer.

12. The method of claim 11, where the vinyl aromatic monomer is styrene.

13. The method of claim 11, where the vinyl aromatic monomer is alpha-methyl styrene.

14. The method of claim 11, where the vinyl aromatic monomer is para methyl styrene.

15. The method of claim 1, where said anionic polymerization catalyst is a solid supported anionic polymerization catalyst having the formula $P(\Psi\text{-Me})_n$, where P is a particle, Ψ represents a divalent group that is base stable and acid cleavable, Me is a metal, and n is an integer greater than 3.

16. The method of claim 15, where Ψ is an acetal group is defined by the formula

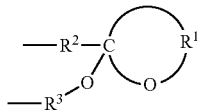

where $R^1$ is a divalent organic group, $R^2$ is a divalent organic group or chemical bond, and $R^3$ is a divalent organic group.

17. The method of claim 15, further comprising the step of treating the polymer with an acid to free the polymer from the particle.

18. The method of claim 1, further comprising the step of treating the polymer, prior to quenching, with a functionalizing agent.

19. A method for gas-phase anionic polymerization of conjugated diene monomers and optionally monomer copolymerizable therewith, the method comprising the steps of:
   (i) charging into a gas-phase reaction zone:
      (a) a solid supported anionic polymerization catalyst having the formula P(Ψ-Me)$_n$ wherein P represents a particle, Ψ represents a divalent group that is base stable and acid cleavable, Me is a a group IA alkali metal atom, and n is an integer equal to or greater than 3; and
      (b) an anionically polymerizable monomer selected from the group consisting of conjugated diolefin monomers having from about 4 to about 12 carbon atoms and the diolefin monomers together with monovinyl aromatic monomers having from about 8 to about 20 carbon atoms;
   (ii) allowing the monomers to polymerize to form a macro-branched polymer; and
   (iii) withdrawing the macro-branched polymer from the reaction zone.

20. The method of claim 19, where Ψ includes an acetal group.

21. The method of claim 20, where the acetal group is defined by the formula

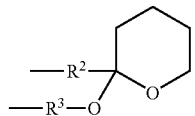

where $R^2$ is a divalent organic group or bond and $R^3$ is a divalent organic group.

22. The method of claim 19, where the solid supported anionic polymerization catalyst is formed by:
   (i) reacting a particle including three or more double bonds or three or more aromatic groups with a lactone in the presence of an acid catalyst;
   (ii) dehydrating the resulting product to form a substituted mono-unsaturated cyclic ether;
   (iii) reacting the substituted mono-unsaturated cyclic ether with a halogenated alcohol to form a halogenated intermediate;
   (iv) treating the halogenated intermediate with an organo Group 1A alkali metal compound in the presence of a polar coordinator.

23. The method of claim 19, further comprising the step of treating the polymer with an acid to free the polymer from the particle.

24. The method of claim 19, further comprising the step of treating the polymer, prior to quenching, with a functionalizing agent.

25. The method of claim 22, where the lactone is butyrolactone.

26. The method of claim 22, where the lactone is valerolactone.

27. The method of claim 22, where the acid catalyst is a Friedel-Crafts catalyst.

28. The method of claim 22, where the substituted mono-unsaturated cyclic ether is substituted dihydropyran.

29. The method of claim 22, where the halogenated alcohol is 3-chloro-propanol.

30. The method of claim 22, where the organo Group 1A alkali metal is an alkyl lithium compound.

31. The method of claim 22, where the polar coordinator is TMEDA.

32. The method of claim 3, wherein derivatives of 2,2,6,6,-tetramethyl-1-piperidinoxyl are selected from the group consisting of 4-hyroxy-2,2,6,6,-tetramethyl-1-piperidinoxyl, 4-acyloxy-2,2,6,6,-tetramethyl-1-piperidinoxyl, 4-amido-2,2,6,6,-tetramethyl-1-piperidinoxyl, and 4-acylated amido-2,2,6,6,-tetramethyl-1-piperidinoxyl.

33. The method of claim 19, where the macro-branched polymer is subjected to a hydrolysis reaction.

* * * * *